July 21, 1942.  A. C. WILCOX  2,290,660
ELECTRIC DRIP COFFEE MAKER
Filed July 27, 1940  2 Sheets-Sheet 1

Inventor
Albert C. Wilcox
By Frease and Bishop
Attorneys

July 21, 1942.  A. C. WILCOX  2,290,660

ELECTRIC DRIP COFFEE MAKER

Filed July 27, 1940  2 Sheets-Sheet 2

Inventor
Albert C. Wilcox
By Frease and Bishop
Attorneys

Patented July 21, 1942

2,290,660

UNITED STATES PATENT OFFICE 2,290,660

ELECTRIC DRIP COFFEE MAKER

Albert C. Wilcox, East Liverpool, Ohio

Application July 27, 1940, Serial No. 347,860

3 Claims. (Cl. 219—43)

The invention relates to drip coffee makers and more particularly to an automatic electric drip coffee maker adapted to automatically open the electric circuit to the heating element when all of the water has been heated to the desired temperature and discharged from the water reservoir.

The object of the invention is to provide a simple and inexpensive electric drip coffee maker including a cold water reservoir, a heating unit through which the water is discharged from the reservoir and including a reservoir cup surrounding the electric heating element, a coffee basket beneath the heating unit and a thermostatic switch arranged to be closed only by manual means and to automatically open when the water has been heated and discharged from the water reservoir through the coffee basket.

Another object is to provide a device of this character in which the water discharged from the water reservoir passes through a tube centrally located through the electric heating element and discharging into a reservoir cup surrounding the heating element and adapted to overflow into the coffee basket.

Figure 1:
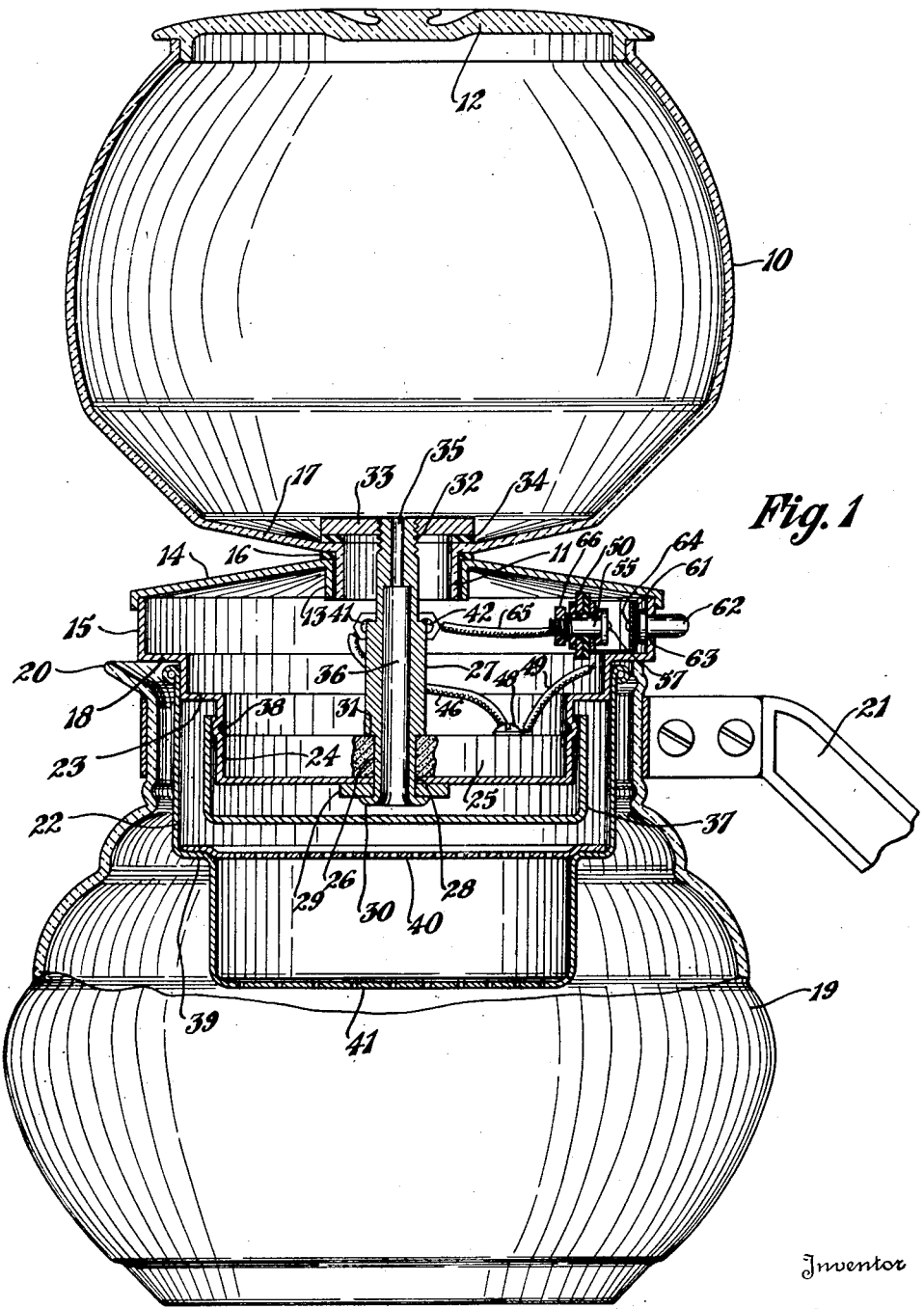
Figure 2:
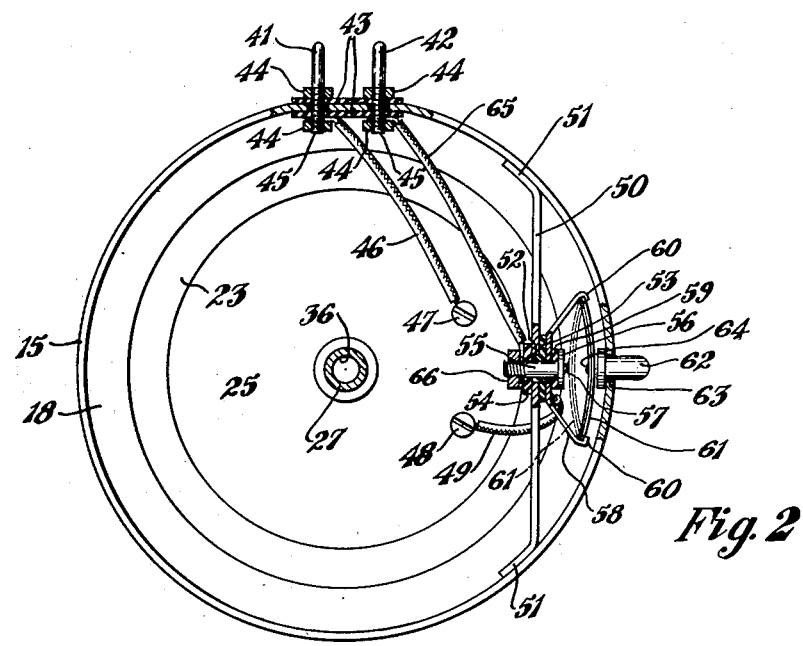
Figure 3:
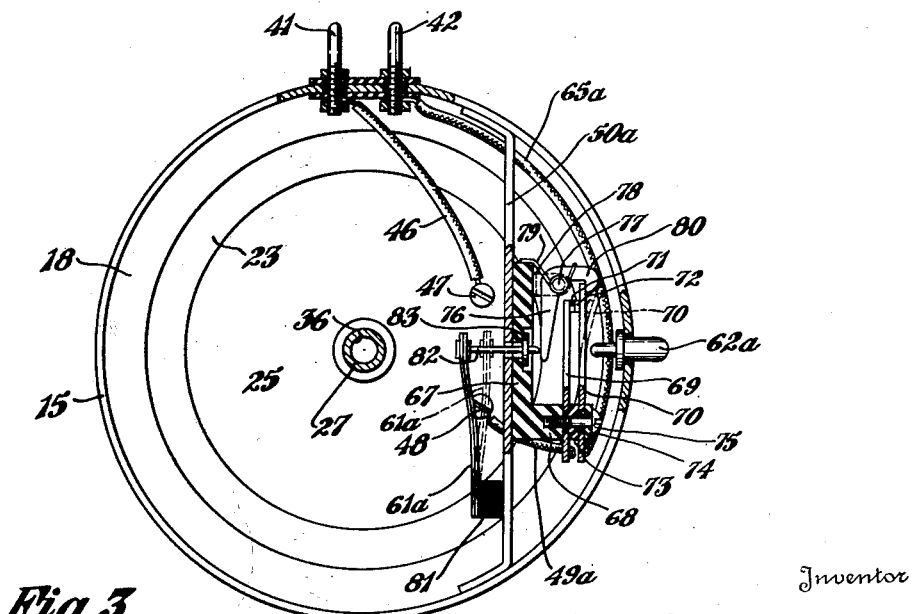

The above objects together with others which will be apparent from the drawings or following description may be attained by constructing the improved drip coffee maker in the manner illustrated in the accompanying drawings in which Figure 1 is a vertical section through an automatic electric drip coffee maker embodying the invention;

Fig. 2, a plan sectional view of the heating unit through the heating unit and thermostatic switch thereof; and Fig. 3, a similar view of a modified form of switch.

Similar numerals refer to similar parts throughout the several views.

The improved drip coffee maker includes a water reservoir or receptacle 10 preferably formed of glass or the like having a reduced central neck 11 at its lower end, the upper open end of the receptacle being adapted to be closed by a cover or lid 12 of any suitable design.

The reduced neck 11 of the water reservoir extends into the depending central annular flange 13 of the cap 14 upon the sheet metal shell or housing 15 which encloses the heating unit.

The gasket 16 of rubber or the like is located between the water reservoir and cap 14 and it should be noted that the bottom wall 17 of the water reservoir is inclined downward toward the center while the cap 14 is inclined downward from the center so as to provide a space between the water reservoir and heating unit to permit cooling air to circulate therethrough and prevent radiation of heat upward from the heating unit to the water container.

The sheet metal shell 15 is shouldered as at 18 to rest upon the upper edge of the coffee pot or receptacle 19 which may be formed of china ware or other suitable material and which is provided with a pouring spout or lip 20 and a handle 21 for manipulating the pot.

Below the shoulder 18 the sheet metal coffee basket 22 may be suspended from the shell 15 by detachably connecting the upper open end of the coffee basket to the shell 15 by any usual and well-known means such as a friction fit.

The shell 15 may be shouldered as at 23 below this point to provide the reduced lower extension 24 within the bottom of which is mounted an electric heating element of any usual and well-known design.

The element shown is in the form of a disklike sealed or enclosed element indicated generally at 25 and fitting within the lower reduced end portion 24 of the shell, and having a central opening 26.

A tube 27 is located through the central opening 26 of the electric heating element and through a corresponding opening 28 in the bottom wall of the reduced portion 24 of the shell, a washer 29 surrounding the lower end of the tube below the shell, the tube terminating in an outturned flange 30 contacting the underside of the washer.

A shoulder 31 is formed upon the tube to contact the top of the heating element 25 so as to hold the same upon the bottom of the shell.

The upper end of the tube 27 projects through the reduced neck 11 of the water reservoir and is threaded as at 32 to receive a nut 33 having a gasket 34 between the same and the bottom wall of the glass water reservoir, said gasket being formed of a suitable composition to withstand heat.

With this construction the heating unit is clamped and sealed to the water reservoir so that the only outlet of water from the reservoir is through the reduced upper end 35 of the central bore 36 of the tube 27.

A reservoir cup 37, of sheet metal or the like, surrounds and is spaced from the lower reduced end of the shell 15 within which the heating element is mounted, being connected at spaced intervals to the reduced portion of said shell a- by the projections 38 to which the cup may be soldered or otherwise attached.

The coffee basket 22 may be of any usual and well-known construction preferably shouldered at a point intermediate its upper and lower ends as at 39 to receive the perforate spreader plate 40.

The bottom 41 of the coffee basket is also perforated as in usual practice.

A pair of plug-in posts 41 and 42 may be located through the shell 15 being insulated therefrom as by the insulation washers 43, nuts 44 being located upon the screw threaded inner ends 45 of the posts to fixedly attach the same to the shell.

A wire 46 leads from the post 41 to a binding screw 47 upon the electric heating element 25.

A similar binding screw 48 connects the wire 49 to the other side of the electric heating element, said wire 49 leading to a thermally operated switch which will now be described.

A support bar 50 is provided at opposite ends with the angular flanges 51 fixedly attached to the shell 15 near one side thereof by any suitable means such as welding, soldering, or otherwise.

This supporting bar supports the switch and is provided with a central opening which receives the reduced end 52 of an insulation gasket 53 located against the outer side of the bar, an insulation gasket 54 being located against the inner side of said bar.

A contact stud 55 is located through the gaskets 53 and 54 and provided at its outer end with a head 56 upon which may be formed a contact point 57.

A curved steel spring clip 58 is provided with a central opening to receive the stud 55 and is clamped against the gasket 53 by means of an insulation washer 59 located between the spring clip 58 and the head 56 of the stud.

The ends of the spring clip 58 are hooked as at 60 to receive the ends of a bi-metal strip 61 which at normal temperatures assumes the position shown in Figs. 1 and 2, holding the push button 62 in the outward position, projecting through the opening 63 in the side wall of the shell 15.

A contact point 64 is formed at the center of the bi-metal strip 61 and adapted to contact with the contact point 57 on the stud 55 when the bi-metal strip is flexed to the dotted line position shown in Fig. 2 by inward pressure upon the push button 62.

A wire 65 is connected to the plug-in point 42 by the nut 44 thereon the other end of said wire being connected to the stud 55 by the nut 66.

In the operation of the improved drip coffee maker, the ground coffee basket 22 is removed from the shell 15 and the desired amount of ground coffee is placed in said basket after which the coffee basket is again attached to the shell 15.

The parts are then assembled in the position shown in Fig. 1, an electric cord of usual and well-known design is attached to the plug-in points 41 and 42 and to a suitable base receptacle or socket, and the push button 62 is pushed inward flexing the bi-metal strip 61 to the dotted line position shown in Fig. 2 so as to complete the circuit from the plug-in points to the electric heating element 25.

The desired amount of cold water is then placed in the water reservoir 10 and as the water is discharged from said reservoir through the bore of the tube 27 it passes through the center of the electric heating element and into the reservoir cup 37 surrounding the heating unit, the water being heated to substantially the boiling point before it overflows from said reservoir cup into the ground coffee basket.

As the water continues to pass through the tube 27 the bi-metal strip 61 remains in this position as the steel spring clip 58 and bi-metal strip are so constructed that the bi-metal strip will not be operated until all of the water has passed out of the reservoir.

The temperature within the shell 15 will then be quickly raised and the bi-metal strip flex and snap outward to the full line position shown in Fig. 2 breaking the circuit to the electric heating element and pushing the button 62 out to the position shown in Figs. 1 and 2.

The bi-metal strip will remain in this position until it is again flexed inward by manual operation of the push button 62, thus assuring safety in the operation of the drip coffee maker.

In Fig. 3 is shown a slightly modified form of thermostatic switch for controlling the heating element. In this form of the invention all of the parts may be the same as shown in Figs. 1 and 2 excepting the switch itself.

A wire 46 connects the plug-in point 41 to the binding screw 47 of the heating element 25 in the manner above described.

The switch is adapted to be mounted upon a support bar 50a corresponding to the bar 50 in Fig. 2.

An insulation block 67 is mounted upon the outer side of the bar 50a and has at one end an extension 68 upon which are mounted in spaced relation and insulated from each other the contact arm 69 and the spring contact arm 70 having contact points 71 and 72 respectively at their free ends.

An insulation spacing washer 73 and an insulation washer 74 cooperate with the screw 75 for attaching the contact arms 69 and 70 to the extension 68 in spaced insulated relation.

The spring arm 70 is so constructed that it normally assumes the broken line position shown in Fig. 3.

An L-shaped locking dog 76 is pivoted as at 77 upon a bracket 78 mounted on the insulation block 67 and is provided with a spring 79 arranged to normally urge said locking dog into the position shown in Fig. 3, the hooked end 80 upon the dog being arranged to engage over the free end of the spring contact strip 70 as shown in the drawings a wire 49a connects the binding screw 48 of the electric heating element with the contact strip 69 and a wire 65a connects the plug-in point 42 with the spring contact strip 70.

A push button 62a is provided for cooperation with the spring contact strip 70 to spring the same inwardly to the closed position as shown in the drawings.

A bi-metal strip 61a is connected at one end to an insulation block 81 fixed upon the inner side of the support bar 50a and a push rod 82 is connected to the free end of said bi-metal strip and adapted to engage the L-shape locking dog 76.

A shoulder 83 is formed upon the push rod 82 for contact with the insulation block 67 to limit the inward movement of the bi-metal strip.

In order to set the thermostatic switch shown in Fig. 3 for operation of the drip coffee maker the push button 62a is pushed inwardly flexing the spring contact strip 70 inward, the free end thereof riding over the hooked end 80 of the locking dog swinging the locking dog upon its pivot to permit the contact strip 70 to be raised beneath said hooked end 80 of the locking dog as shown in the full line position in Fig. 3, closing the circuit through the contacts 71 and 72.

The operation of the drip coffee maker will be the same as above described and when all of the water has been discharged from the water reservoir and heated the rise in temperature in the shell 15 will cause the bi-metal strip 61a to flex to the broken line position shown in Fig. 3, the push rod 82 swinging the locking dog 76 upon its pivot releasing the free end of the spring contact strip 70 and permitting said strip to fly outward to the open position shown in broken line, breaking the circuit to the electric heating element.

The circuit will remain broken until the switch is again manually operated by depression of the push button 62a.

I claim:

1. In a device of the character described, the combination of an electric heating element, thermostatically controlled electric switch mechanism for controlling the circuit to said heating element, said switch comprising a fixed contact point interposed in said circuit, a curved spring clip through which said contact point is located, means insulating the contact point from the clip; a bimetal strip supported at both ends upon the ends of the curved spring clip at points on opposite sides of said fixed contact and having a contact point at its center, said bimetal strip being normally bowed away from said fixed contact point, the bimetal strip being interposed in the circuit and electrically insulated from the fixed contact point, and a manually operated push button for bowing the bimetal strip toward the fixed contact point so that the contact point on the bimetal strip contacts the fixed contact point closing the circuit, said bimetal strip being so constructed that at a predetermined rise in temperature it will bow outward separating the contact points.

2. In a device of the character described, the combination of an electric heating element, thermostatically controlled electric switch mechanism for controlling the circuit to said heating element, said switch comprising a fixed contact point interposed in said circuit, a curved spring clip adjacent to said fixed contact, a bimetal strip supported at its ends upon the spring clip and having a contact point at its center, said bimetal strip being normally bowed away from said fixed contact point, the bimetal strip being interposed in the circuit and electrically insulated from the fixed contact point, and a manually operated push button for bowing the bimetal strip toward the fixed contact point so that the contact point on the bimetal strip contacts the fixed contact point closing the circuit, said bimetal strip being so constructed that at a predetermined rise in temperature it will bow outward separating the contact points.

3. In a device of the character described, the combination of an electric heating element, thermostatically controlled electric switch mechanism for controlling the circuit to said heating element, said switch comprising a fixed contact point interposed in said circuit, a curved spring clip adjacent to said fixed contact and having hooked ends, a bimetal strip supported at its ends in said hooked ends and having a contact point at its center, said bimetal strip being normally bowed away from said fixed contact point, the bimetal strip being interposed in the circuit and electrically insulated from the fixed contact point, and a manually operated push button for bowing the bimetal strip toward the fixed contact point so that the contact point on the bimetal strip contacts the fixed contact point closing the circuit, said bimetal strip being so constructed that at a predetermined rise in temperature it will bow outward separating the contact points.

ALBERT C. WILCOX.